US008698732B2

(12) United States Patent
Fujimori

(10) Patent No.: US 8,698,732 B2
(45) Date of Patent: Apr. 15, 2014

(54) OUTDOOR DISPLAY SYSTEM AND DISPLAY APPARATUS

(75) Inventor: Hideo Fujimori, Sakai (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 3 days.

(21) Appl. No.: 13/116,707

(22) Filed: May 26, 2011

(65) Prior Publication Data

US 2011/0298697 A1 Dec. 8, 2011

(30) Foreign Application Priority Data

Jun. 3, 2010 (JP) ................................ 2010-127718

(51) Int. Cl.
*G09G 3/34* (2006.01)
*G06F 3/038* (2013.01)
*G09G 5/00* (2006.01)
*G09G 3/18* (2006.01)

(52) U.S. Cl.
USPC ............... 345/102; 345/211; 345/52; 345/2.3

(58) Field of Classification Search
USPC .................................... 345/102, 211, 52, 2.3
See application file for complete search history.

(56) References Cited

U.S. PATENT DOCUMENTS

2001/0003451 A1* 6/2001 Armstrong .................... 345/173
2004/0113903 A1* 6/2004 Mikami et al. ................ 345/204
2005/0072060 A1 4/2005 Moncho et al.
2005/0137754 A1 6/2005 Bartlett
2007/0070057 A1* 3/2007 Sanoner et al. ............... 345/211
2007/0188483 A1* 8/2007 Bonner ......................... 345/204
2011/0187753 A1* 8/2011 Watanabe ..................... 345/690

FOREIGN PATENT DOCUMENTS

CN 201302791 Y 9/2009
GB 2453723 A 4/2009
JP 2004-212443 A 7/2004
JP 2005-321737 A 11/2005
JP 2008-005572 A 1/2008
JP 2009-259175 A 11/2009
JP 2009-294284 A 12/2009

OTHER PUBLICATIONS

Extended European Search report issued on Jul 9, 2011 in the corresponding European Patent Application No. 11168226.6-1231.
English language abstract and machine translation for JP 2005-321737 A, published Nov. 17, 2005.
English language abstract and machine translation for JP 2008-005572 A, published Jan. 10, 2008.
English language abstract and machine translation for JP 2009-259175 A, published Nov. 5, 2009.

* cited by examiner

*Primary Examiner* — Aneeta Yodichkas
(74) *Attorney, Agent, or Firm* — NDQ&M Watchstone LLP

(57) ABSTRACT

The outdoor display system has a solar cell; an electricity storing unit which stores electricity obtained by the solar cell, and a display apparatus having a displaying portion displaying contents, wherein the apparatus is supplied an electric power from the storing unit or solar cell. The display apparatus may contain a display panel which displays contents; a receiving unit which receives contents transmitted wireless; a backlight which irradiates light to the display panel, and a control unit which controls the displaying of the received contents in the display panel. The control unit may perform the luminosity control of the backlight according to a residual capacity of the electricity storing unit.

3 Claims, 3 Drawing Sheets

OUTDOOR DISPLAY SYSTEM AND DISPLAY APPARATUS

CROSS-REFERENCE TO RELATED APPLICATIONS

This application is based on Japanese Patent Application No. 2010-127718 filed on Jun. 3, 2010, the contents of which are hereby incorporated by reference.

BACKGROUND OF THE INVENTION

1. Field of the Invention

The present invention relates to an outdoor display system or a display apparatus. Specifically, the system equips a power generator such as a solar cell, and is suitable when employed as bus stop etc.

2. Description of the Related Art

In recent years, an advertising media called digital signage is appearing. In the digital signage, images or information are displayed on a flat-panel display using a digital technology. Such digital signage apparatus is utilized in facilities such as bus stops.

However, when installing digital signage displays outdoors, since electric power needs to be supplied from a power line, besides installation works, electric construction is further needed. This is one of the obstacles when marketing the digital signage apparatuses.

SUMMARY OF THE INVENTION

The outdoor display system according to the present invention has a solar cell; an electricity storing unit which stores electricity obtained by the solar cell, and a display apparatus having a displaying portion displaying contents, wherein the apparatus is supplied an electric power from the storing unit or the solar cell.

DESCRIPTION OF THE PREFERRED EMBODIMENTS

Figure 1:
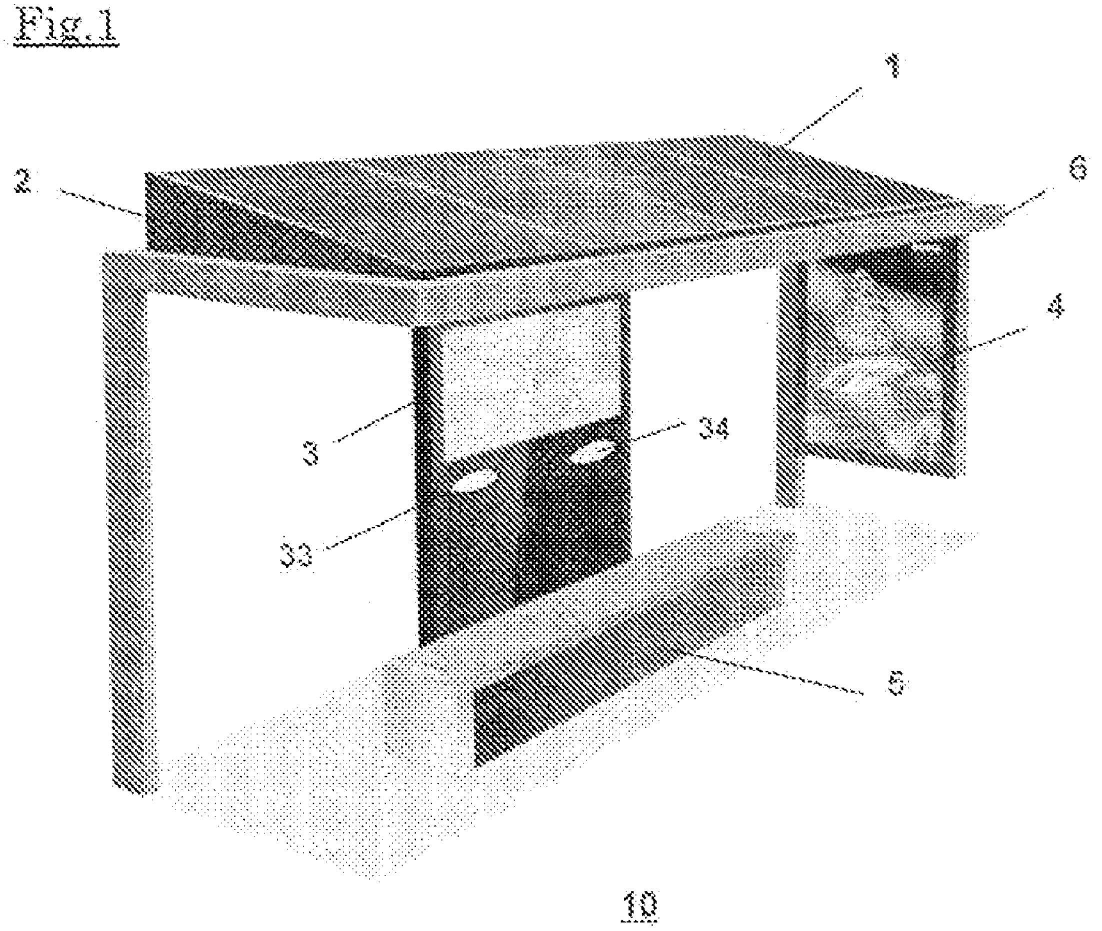
FIG. 1 is an outline view of the outdoor display system 10.

FIG. 1 is an outline view of the outdoor display system 10 which is an embodiment of the present invention.

The outdoor display system 10 has a solar cell 1, a secondary battery 2, a display apparatus 3, a poster 4, a bench (seat) 5, and a roof 6. On the surface of the display apparatus 3, the human sensor 33 and a camera sensor 34 are arranged.

The solar cell 1 generates electricity by photo-electric converting the sunlight. Here, the cell 1 includes a solar cell module consisted by solar array panels etc., and the inverter. The electric power obtained by the solar cell 1 is stored in the battery 2. The secondary battery 2 is a lithium-ion battery (battery pack), for example. Between the cell 1 and the battery 2, an inverter or controller controlling the charging or discharging in the battery 2 may intervene in between.

The display apparatus 3 is a LCD display equipped with a display panel 32 such as a Liquid Crystal Panel (LCD). The apparatus 3 displays contents (images) transmitted from an external contents server or a broadcasting station, or contents stored in a supplemental (add-on) storage devices. When installed in a bus stop, the apparatus 3 displays a route map of the bus, a operating situation (for example, the arrival information of a bus at a neighboring bus stop) etc.

Further, in the present embodiment, the apparatus 3 has an antenna (contained in the receiving portion 35 mentioned below) for receiving contents transmitted wireless.

As described above, the apparatus 3 is driven by electricity generated by the solar cell 1, and does not require electric power from a power line. In other words, the display apparatus 3 operates in "off-grid". Thus, the electric construction for drawing electric power from the power line is not necessary. Further, by equipping an antenna, it is unnecessary to install the cable for connecting to a LAN or WAN networks to receive contents data. Thereby, this outdoor display system 10 mitigates the burden of installation, and should contribute for marketing (sale or wide use) of the digital signage systems.

In the lower part surface of an image displaying portion of the display apparatus 3, the human sensor 33 and the camera sensor 34 are arranged.

The human sensor 33 is for detecting an existence of a person in the bus stop, and for example, an infrared sensor is used. When the sensor 33 determines that a person does not exist, the display apparatus 3 reduces the illumination of the backlight 39, or turns the backlight 39 off. Thereby, the electric power is reduced.

The camera sensor 34 determines an attributes of a person in the bus stop based on photographed images. When determined that a person is female, for example, an advertisement of cosmetics may be displayed. When it is determined male, an advertisement of beer may be displayed.

A poster 4 comprises an advertising film which transmits a light and advertisement is printed thereon, and a fluorescent light which irradiates the film from the inner side (side opposite from the displaying side). The poster 4 is similar to the display apparatus 3 in sense that it displays an advertisement. However, the image displayed in the apparatus 3 changes every moment according to the received contents (i.e. if the contents is a moving image, the displaying image changes every seconds), while the image displayed in the poster 4 does not change basically since the poster displays a printed advertisement.

A bench 5 is arranged for a person in the bus stop, so that a person can sit down while waiting for the bus, and is arranged in the front side of the display apparatus 3. When the display apparatus 3 installed on the sidewalk and facing its backside to the street (driveway), a person sitting on the bench 5 is to be waiting for the bus while watching the advertising contents displayed on the apparatus 3. When the display apparatus 3 is installed facing its displaying side to the street (driveway), a passenger in the bus, a person in a car driving down the street, or a person on the sidewalk on the opposite side of the street can watch the advertising contents displayed on the apparatus 3. Needless to say, a person sitting on the bench 5 can watch advertising contents if he turns his back to the street too.

The roof 6 is arranged above the display apparatus 3 and functions as a shade or a rain-cover for the apparatus 3. Also it covers a person waiting for the bus. On the roof 6, the solar cell 1 or the secondary battery 2 is arranged, thus the roof 6 functions as installation stands also. Considering the direction of the sunlight, the surface of the cell 1 is inclined against the roof 6. The battery 2 may be arranged between the cell 1 and the roof 6, utilizing a triangular prism-like space occurred by the inclined roof 6.

Figure 2:
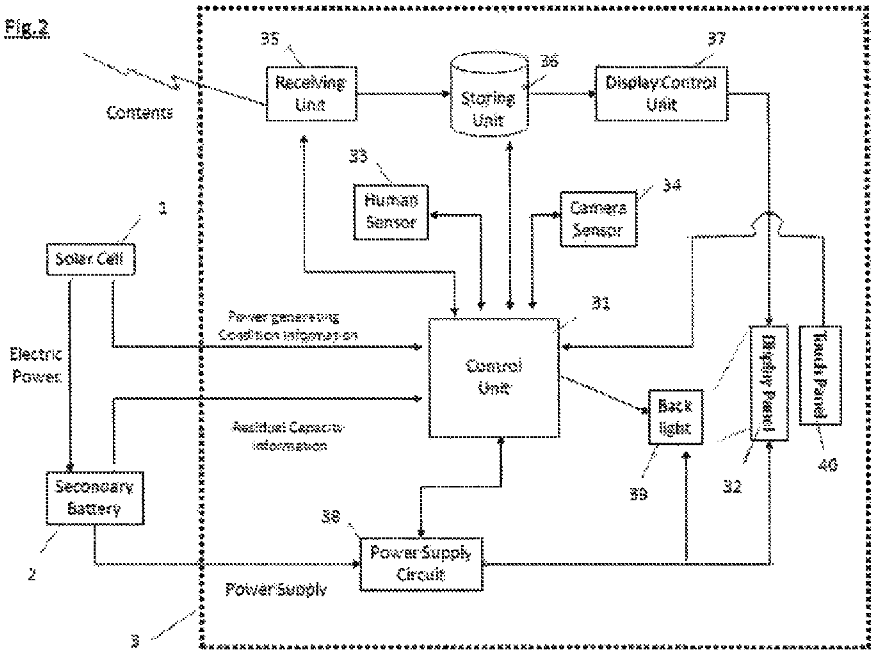
FIG. 2 is a block diagram showing a composition of the outdoor display system 10.

FIG. 2 is a block diagram showing the composition of the outdoor display system 10. As mentioned referring to the FIG. 1, the system 10 has a solar cell 1, a secondary battery 2, and a display apparatus 3. The apparatus 3 has a control unit 31, a display panel 32, a human sensor 33, a camera sensor 34, a receiving unit 35, a storage unit 36, a display control unit 37, a power supply circuit 38, a backlight 39, and a touch panel 40.

The electric power generated by the solar cell 1 is stored in the secondary battery 2. The solar cell 1 transmits the information regarding to power generating condition to the display apparatus 3. The battery 2 supplies electric power to the apparatus 3. The battery 2 transmits its residual capacity information. As mentioned above, the display apparatus 3 of the present embodiment does not basically receive electric power supply from a power line, and operates as "off-grid". The capability of the solar cell 1 should be selected or designed considering the power consumption of the display apparatus 3. First, the electric-generating capacity required for the solar cell should be determined based on the amount of power consumption in the apparatus 3. Then, of the size (surface area) of the cell should be determined considering the power generating efficiency of the solar cell 1. The capacity of the secondary battery 2 should be determined considering the case when sunlight does not glare, such as rainy weather or night time.

The control unit 31 collects the state information of each portion (i.e. the display panel 32, the touch panel 40 etc.) of the display apparatus 3. The unit 31 controls each of the portions based on the collected information. The power generating status information from the solar cell 1 or the residual capacity information from the secondary battery 2 are also inputted to the control unit 31. The unit 31 is constituted by CPU.

The display panel 32 is a portion which actually displays an image, and an LCD panel is employed for display apparatus 3. In the panel, liquid crystal corresponding to each pixel of the panel is driven between ON/OFF state (or to intermediate state).

The human sensor 33 is for detecting the person's existence in the bus stop as described above. The camera sensor 34 is for determining the characteristic of the person in the bus stop. The sensors 33 and 34 are connected with the control unit 31, and the detected results in these sensors are inputted to the unit 31.

The receiving part 35 has an antenna which receives a signal from contents server (for example, ASP server, or personal computer) transmitted by wireless networks (for example, WiMAX or IEEE802.11b/g), and a signal-processing unit which demodulates the signal received by the antenna. When the received signal is a MPEG 2-TS format signal modulated by OFDM system, the unit 35 demodulates the OFDM signal and then extracts the MPEG 2-TS signal. The extracted MPEG 2-TS signal is outputted to the storage unit 36. The unit 35 may also have a function for receiving a broadcast wave from a television broadcasting station, like an ordinary television does.

The storage unit 36 stores a MPEG 2-TS signal extracted by the receiving unit 35. In other words, the unit 36 stores the contents transmitted from contents server or broadcasting station. If the content is real-time type content (which is displayed by the display panel 32 immediately after the reception in the receiving unit 35), the storage unit 36 functions as a buffer memory. If the content is storage-type contents (which is displayed according to the operation of a user or displayed based on a time schedule), the storage unit 36 functions as storage media.

The display control unit 37 performs a display control in the display panel 32. Specifically, according to the image signal of the contents, the unit 37 controls the corresponding pixels of the display panel 32 (LCD panel). Since the unit 37 needs to perform a high-speed processing, hardware circuit provided independently from the control unit 31 (constituted by CPU) is utilized.

The power supply circuit 38 supplies power to each portion of the display apparatus 3. Based on an assumption that the power consumption in the display panel 32 and the backlight 39 is larger than the other portions, it is described in FIG. 2 such that the power is supplied only to the panel 32 and the backlight 39. However, the power supply circuit 38 actually supplies electric power to the receiving unit 35, the storing unit 36, the display control unit 37, the human sensor 33, the camera sensor 34, and the touch panel 40 as well.

The backlight 39 irradiates a light to the display panel 32. As this backlight, fluorescent light or an LED light source is used for example. Since the display apparatus 3 of the present embodiment is used in "off-grid" mode, it is desired that the power consumption is low. In this view, LED light source may be desirable.

The touch panel 40 is transparent and is an electric capacity-type touch sensor. This touch panel 40 is arranged at the front side of the display panel 32. The touch panel 40 accepts an input from a user. For example, when the display panel 32 displays the image of buttons for accepting the user to make selection out of three choices, it regards the input is made by a user when the user touches a position corresponding to the button image.

Figure 3:
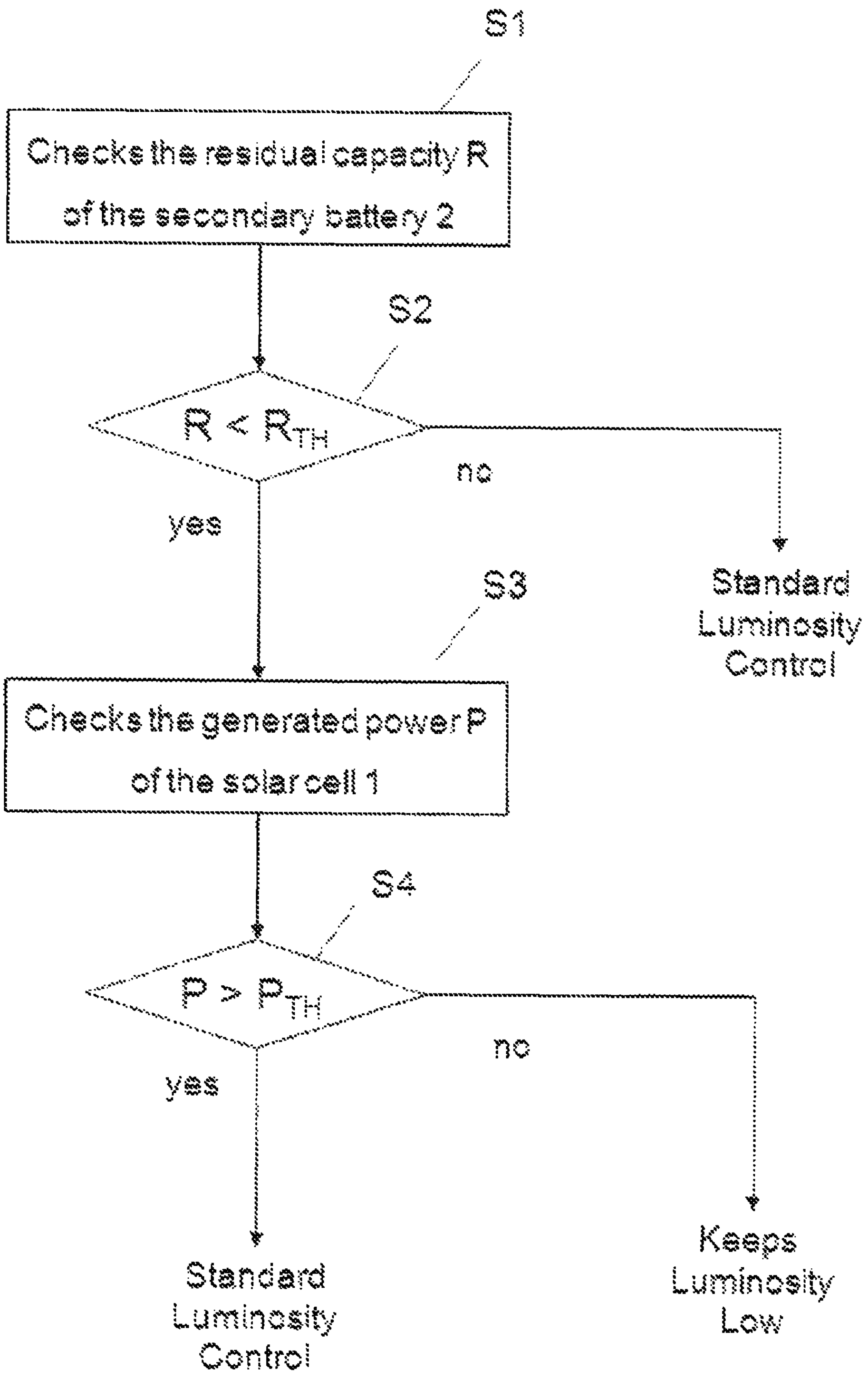
FIG. 3 is a flow chart showing an example of the displaying process executed by the display apparatus 3.

FIG. 3 is a flow chart showing an example of a displaying process performed by the display apparatus 3. Since various kinds of displaying processes are provided in the displaying apparatus 3, here, it is focused on a displaying process adapted to a residual capacity of the secondary battery 2 which is a process peculiar to the present invention.

In Step S1, the control unit 31 checks the residual capacity R based on an information inputted from the secondary battery 2. In the Step S2, it is determined whether the R is less than the predetermined capacity $R_{TH}$ or not. When the R is equal to or larger than the $R_{TH}$ (when determined "no" in Step S2), since the residual capacity of the battery 2 is large enough, the ordinal luminosity control is performed. In other word, the luminosity of the backlight is set to a standard value. When R is less than $R_{TH}$ (when determined "yes" at Step S2), it proceeds to Step S3.

In Step S3, the control unit 31 checks the current amount of generated electricity P based on the input from the solar cell 1. In Step S4, it is determined whether the P is larger than the predetermined value $P_{TH}$ or not. When P is larger than $P_{TH}$ (when it is determined "yes" in Step S4), it is in a state the sun is irradiating, and the solar cell 1 is in a power generating state. Therefore, assuming that the electricity stored in the storage battery 2 will not vanish because the solar cell 1 is in a power generating state even though the residual capacity of the battery 2 is small, the ordinal luminosity control is performed. On the other hand, when the sunlight is not irradiating (for example, nighttime, cloudy, or rainy weather), P becomes smaller than $P_{TH}$ (in such case, it is determined "no" in Step S4). Nonetheless, if the display apparatus 3 is kept on driving, the residual capacity of the secondary battery 2 becomes zero at some time-point. Thus, the luminosity of the backlight is set lower than the standard setting in order to save the power consumption.

The embodiment of the present invention is described as above. However, the scope of the present invention is not limited thereto, and the present invention may be implemented by being subjected to various modifications without departing from the gist of the present invention.

For example, the luminosity controlling process of the display apparatus 3 is not restricted to the one mentioned in the above flowchart. In the daytime, the contrast degrades because of the sunlight, and the visibility of the display panel 32 falls, thus the luminosity of the backlight 39 may be set high in the daytime. On the other hand, in the nighttime, the contrast becomes large, thus luminosity of the backlight 39 may be set low. Further, it is ideal to keep the luminosity of the backlight 39 low at night, considering that the solar cell 1 cannot generate electricity in nighttime. Further, the luminosity of the backlight 39 can be controlled according to the outdoor temperature. For example, when the outdoor temperature of the display apparatus 3 is high, inside of the apparatus 3 may also become high, and this may deteriorate the characteristic of the liquid crystal in the display panel 32 or performance of the electronic circuits. Therefore, in order to suppress a heat generation from the backlight 39, the luminosity of the backlight 39 may be controlled low, when the outdoor temperature is high. Further, the luminosity of the backlight 39 may be controlled low even though when the outside temperature is low, if the temperature inside the housing of the display apparatus 3 is high.

In the above-mentioned embodiment, two sensors, i.e. the human sensor 33 and the camera sensor 34 are employed; however, the camera sensor 34 may also function as a human sensor. In such case, existence of a person is detected from a captured image instead of using infrared rays done by human sensor 33.

In the above, an LCD panel is explained as an example of the display portion of the display apparatus 3; however, plasma panel, organic EL (Electro-Luminescence), electronic paper, CRT, or an advertising film may be employed as the display portion instead.

In the above, the luminosity control of the apparatus 3 is achieved by the control part 31, however, this control may be performed by a dedicated control apparatus, which is separated (or independent) from the apparatus 3.

In the above, all the electricity generated in the solar cell 1 is stored in the secondary battery 2, however, the electric power generated by the cell 1 may be supplied directly to the display apparatus 3. In such case, a control device may be arranged between the solar cell 1, the secondary battery 2, and the display apparatus 3. This control device compares the amount of generated electricity in the solar cell 1 and the power consumption of the display apparatus 3 and if the generated amount is larger than the consumption, the surplus electric power may be charged by the secondary battery 2. When the generated electricity is smaller than the power consumption, the electricity stored in the battery 2 may be utilized in the display apparatus 3.

In the above, the secondary battery 2 is arranged on the roof 6 as well as the solar cell 1. However, the battery 2 may be arranged under the roof 6, or under the display apparatus 3.

What is claimed is:

1. An outdoor display system comprising:
- a solar cell;
- an electricity storing unit which stores electricity obtained by the solar cell;
- a display apparatus having a displaying portion displaying contents, wherein the apparatus is supplied electricity from the storing unit or the solar cell;
- wherein, said display apparatus comprises:
  - a display panel which displays contents;
  - a backlight which irradiates light to the display panel; and
  - a control unit which controls the displaying of the received contents in the display panel, with the control unit performing the luminosity control of the backlight adapted to a residual capacity of the electricity storing unit;
- and further wherein;
- the control unit receives information of residual capacity of the electricity storing unit,
- the control unit controls the luminosity of the backlight based on the daylight illumination amount and the residual capacity of the electricity storing unit when the solar cell is not generating electricity; and
- the control unit controls the luminosity of the backlight based on the daylight illumination amount only, out of the daylight illumination amount and the residual capacity of the electricity storing unit, when the solar cell is generating electricity.

2. The outdoor display system according to claim 1, wherein the display apparatus further comprises:
- a detecting unit configured to detect a potential observer of at least a portion of the display panel within a pre-set area adjacent to the display apparatus
- wherein the control unit reduces illumination of a backlight or turns the backlight off when the detecting unit fails to detect a potential observer.

3. The outdoor display system according to claim 1, wherein the display apparatus further comprises:
- a detecting unit configured to detect an attribute of a potential observer of at least a portion of the display panel, when the potential observer is within a pre-set area adjacent to the display apparatus; and
- a second control unit which switches the contents displayed on the display panel based on the attribute detected by the detecting unit.

* * * * *